United States Patent [19]

Aoyagi et al.

[11] Patent Number: 4,464,898
[45] Date of Patent: Aug. 14, 1984

[54] HYDRAULIC POWER SYSTEM

[75] Inventors: Yukio Aoyagi, Ibaraki; Shuichi Ichiyama, Tsuchiura; Yasuhiko Murata, Ibaraki, all of Japan

[73] Assignee: Hitachi Construction Machinery Co., Ltd., Tokyo, Japan

[21] Appl. No.: 332,934

[22] Filed: Dec. 21, 1981

[30] Foreign Application Priority Data

Dec. 27, 1980 [JP] Japan ................ 55/187130

[51] Int. Cl.³ .................... F16D 33/00
[52] U.S. Cl. .................... 60/436; 60/441; 60/442
[58] Field of Search .......... 60/435, 436, 441, 442

[56] References Cited

U.S. PATENT DOCUMENTS

| 2,789,542 | 4/1957 | Van der Kay | 60/436 X |
| 3,125,324 | 3/1964 | Vivier | 60/466 |
| 3,601,235 | 8/1971 | Huf | 60/441 X |
| 3,750,406 | 8/1973 | Verlinde et al. | 60/442 |
| 3,908,376 | 9/1975 | Steiger | 60/428 |
| 3,913,453 | 10/1975 | Parquet | 60/460 |
| 3,943,714 | 3/1976 | Reinker | 91/461 |
| 3,960,059 | 6/1976 | Schexnayder | 91/461 |
| 3,972,185 | 8/1976 | Medina | 60/486 |
| 4,014,198 | 3/1977 | Herrmann | 60/489 |
| 4,126,082 | 1/1978 | Klitz | 91/41 |
| 4,189,921 | 2/1980 | Knapp | 60/445 |
| 4,199,942 | 4/1980 | Kasper | 60/452 |
| 4,212,164 | 7/1980 | Young | 60/452 |
| 4,350,078 | 9/1982 | Olofsson | 91/401 |

FOREIGN PATENT DOCUMENTS 2400719 7/1975 Fed. Rep. of Germany .

Primary Examiner—Allen M. Ostrager
Attorney, Agent, or Firm—Antonelli, Terry & Wands

[57] ABSTRACT

A hydraulic power system having a variable displacement hydraulic pump, a hydraulic motor driven by the hydraulic pump for actuating a load, the pump and motor being connected to constitute a closed hydraulic circuit, hydraulic servo for controlling the displacement volume of the pump, and motor stopping device including a brake arrangement adapted to release the motor from a braked condition when a control pressure from a hydraulic fluid source is received. The system includes a control valve responsive to a main line pressure in the closed hydraulic circuit for controlling a hydraulic fluid supply to the servo to prevent the main line pressure from substantially exceeding a predetermined level, first pressure transmission control interlocked with an input of the servo for transmitting the control pressure to the brake arrangement when the input is actuated, and a second pressure transmission control responsive to the pressure of a hydraulic fluid supply to the servo on the output side of the control valve for transmitting the control pressure to the brake arrangement when the supply pressure is substantially lower than a normal supply pressure of the hydraulic fluid source.

5 Claims, 2 Drawing Figures

HYDRAULIC POWER SYSTEM

BACKGROUND OF THE INVENTION

This invention relates to hydraulic power systems, and, more particularly, to a hydraulic power system suitable for driving a load having high inertia such as a swivelling member of a hydraulic excavator, wherein a motor stopping means for preventing a hydraulic motor from rotating can automatically be actuated.

Generally, in a hydraulic power system including a suitable hydraulic motor for driving a load having a high inertia such as, for example, a swivelling member of a hydraulic excavator, it is necessary to detect whether the hydraulic motor is inoperative or operating at a velocity near the position in which it is inoperative, in order to automatically actuate motor stopping means for preventing the hydraulic motor from rotating without causing wear or damage thereto.

In, for example Japanese patent application Laid-Open No. 98470/79 and Japanese Utility Model Application Laid-Open No. 13222/80, a control device with a detecting means of the aforementioned type is proposed wherein the output shaft of a hydraulic motor for actuating a load has connected thereto an ancillary hydraulic pump, separate from a hydraulic pump for actuating a hydraulic motor, so that the condition of rotation of the hydraulic motor can be detected by the pressure fluid delivered thereby. A disadvantage of this proposed control device resides in the fact that the construction is relatively complex by virtue of the addition of the ancillary hydraulic pump thereby increasing the overall cost and, morever, the proposed construction is subject to a loss of power.

In Japanese patent application Laid-Open No. 98471/79, another type of control device is proposed wherein a throttle valve is mounted anteriorly or posteriorly of a hydraulic motor in a main line in which the hydraulic motor is mounted, so that the flow of the hydraulic fluid in the main line can be detected by the differential pressure in the throttle valve and the condition of rotation of the hydraulic motor can be detected thereby. A disadvantage of this type of control device resides in the fact that the provision of the throttle valve in the main line would cause a loss of power to occur due to a pressure loss.

In still another control device, cross-over relief valves are mounted anteriorly and posteriorly of a hydraulic motor in a main line in which the hydraulic motor is mounted and the relief condition of such valves is detected. On this device, the condition of rotation of the hydraulic motor is detected because the condition of a pumping action of the hydraulic motor is detected. A disadvantage of this control device resides in the fact that it would not be possible to obtain accurate results of a detection because the performance thereof is generally governed by the characteristics of the cross-over relief valves in which the operation of the relief valves becomes unstable in a low flow rate region.

Heretofore, in a hydraulic closed circuit, proposals have been made to use a control device which is operative to actuate motor stopping means for preventing a hydraulic motor from rotating only when a control lever for controlling the displacement volume of a variable displacement hydraulic pump is in a neutral position. When a load of high inertia is driven, the hydraulic motor may continue to rotate while relieving is carried out through cross-over relief valves even if the control valve is restored to the neutral position. In order to avoid operation of the motor stopping means in this condition, proposals have been made, as disclosed, for example, in Japanese patent application Laid-Open No. 108170/79, to provide a predetermined time lag after the control lever is restored to the neutral position before the motor stopping means begins to operate. This time lag is obtained, for example, by providing a throttle valve in a line in which the motor stopping means is mounted. However, setting of a time lag by means of a throttle valve is not desirable because the time lag might be caused to vary by wide changes in the viscosity of the working fluid that might occur when the working fluid has its temperature undergo changes. Moreover, as in the case of a swivelling member of a hydraulic excavator, where the inertia of a load applied to the hydraulic motor greatly varies depending on the condition of the load of an earth-moving machine and the position of such load, the period of time in which the relieving condition of the cross-over relief valves continues to exist would greatly vary. Thus, difficulties would be encountered in setting the time lag for allowing the motor stopping means to be actuated immediately after the hydraulic motor is essentially rendered inoperative in such a manner that the time lag suits all the conditions.

SUMMARY OF THE INVENTION

Accordingly, the invention has as its object the provision of a hydraulic power system capable of automatically actuating motor stopping means for preventing a hydraulic motor from rotating immediately after the hydraulic motor stops rotating.

The aforesaid object is accomplished according to the invention by providing a hydraulic power system comprising a variable displacement hydraulic pump, a hydraulic motor driven by said hydraulic pump for actuating a load, with the pump and motor being connected to constitute a closed hydraulic circuit. A hydraulic servo means controls the displacement volume of the pump, and a motor stopping means includes brake means adapted to release the motor from a braked condition when a control pressure from a hydraulic fluid source is received. The hydraulic power system comprises a control valve, responsive to a main line pressure in the closed hydraulic circuit, for controlling a hydraulic fluid supply to the servo means to prevent the main line pressure from substantially exceeding a predetermined level, first pressure transmission control means interlocked with input means of the servo means for transmitting the control pressure to the brake means when the input means is actuated, and second pressure transmission control means responsive to the pressure of a hydraulic fluid supply to the servo means on the output side of the control valve for transmitting the control pressure to the brake means when the supply pressure is substantially lower than a normal supply pressure of the hydraulic fluid source.

In a preferred embodiment, the first pressure transmission control means comprises a first directional control valve interlocked with the input means of the servo means, and the second pressure transmission control means comprises a second directional control valve connected in parallel with the first directional control valve and actuated by the supply pressure to said servo means. Preferably, the system further comprises line means for transmitting the control pressure therethrough to the brake means, and a shuttle valve connected to the line means for selecting, as the control pressure, a higher pressure of the pressures from the first and second directional control valves, and the first and second directional control valves allow the line means to be communicated with a drain when they are not actuated.

The brake means may comprise a brake cylinder for applying the brake force to an output shaft of the hydraulic motor. Alternatively, the brake means may comprise on-off valves mounted in main lines of the closed hydraulic circuit.

DESCRIPTION OF THE PREFERRED EMBODIMENTS

Figure 1:
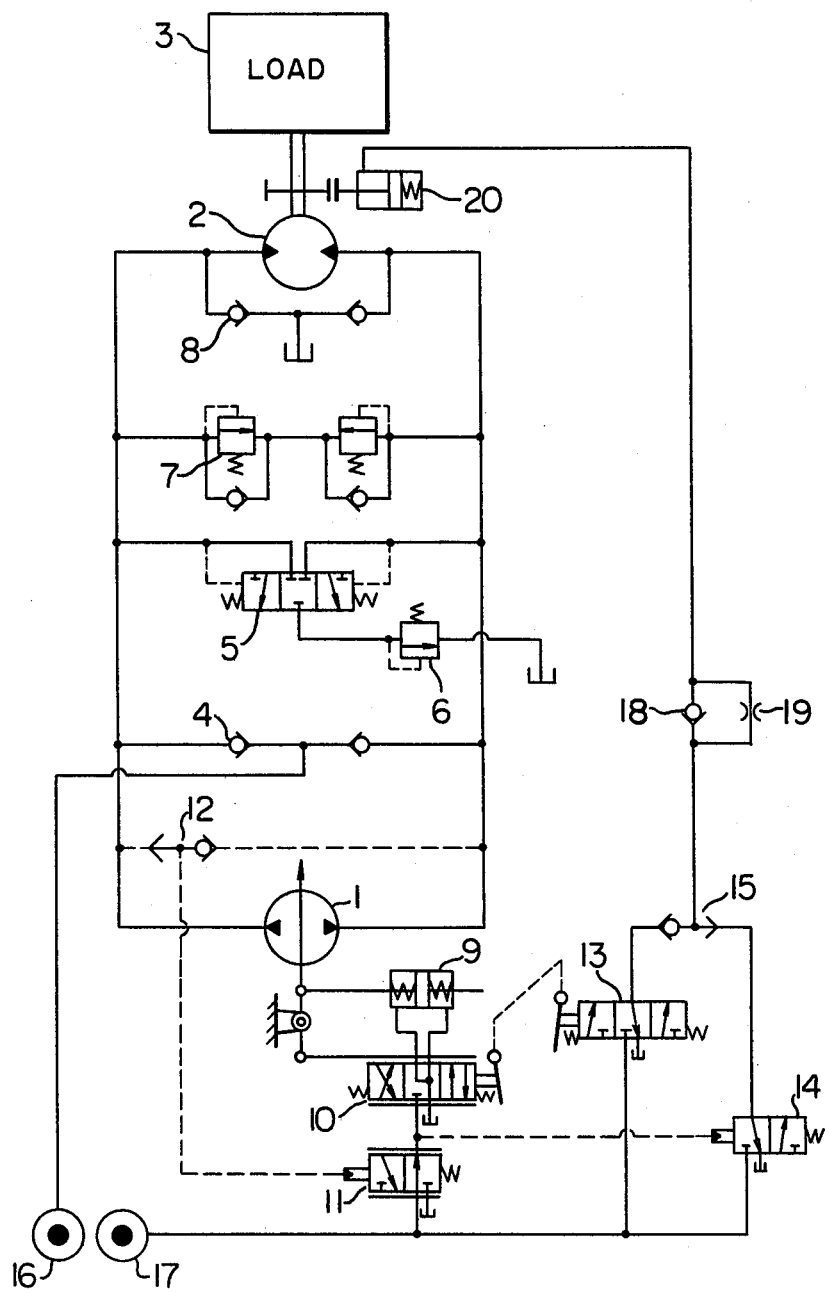
FIG. 1 is a circuit diagram of the hydraulic power system comprising a first embodiment of the invention.

As shown in FIG. 1, hydraulic power system comprises a variable displacement hydraulic pump 1 and a hydraulic motor 2 driven by the pump 1, with the motor 2 being adapted to actuate a load 3. The pump 1 and motor 2 are connected to constitute a closed hydraulic circuit, to which a charge of hydraulic fluid is supplied from a charge hydraulic fluid source 16. Check valves 4 are interposed between main lines connecting the pump 1 to the motor 2 and the charge hydraulic fluid source 16. Excess flow of hydraulic fluid in the closed circuit corresponding to the charge hydraulic fluid from the source 16 is discharged from a lower-pressure main line by means of a flushing valve 5. Located downstream of the flushing valve 5 is relief valve 6 for setting a lowest pressure for the closed hydraulic circuit, while a highest pressure for the closed hydraulic circuit is set by crossover relief valves 7. Check valves 8 are arranged for supplying a hydraulic fluid to the closed hydraulic circuit from a reservoir in the absence of a charge from the charge hydraulic fluid source 16. The pump 1 is connected to a servo cylinder 9 for operating a displacement volume control member of the pump 1. The servo cylinder 9 is controlled by a servo valve in response to an actuation of input means such as an operation lever. The servo cylinder 9 and servo valve 10 constitute a hydraulic servo means for controlling the displacement volume of the variable displacement hydraulic pump 1. The motor 2 is prevented from rotating by motor stopping means 20, in an operative position, which may be brake means comprising a hydraulic cylinder applying the brake force to an output shaft of the motor 2. The brake means 20 is supplied with a control pressure from a hydraulic fluid source 17 for releasing the brake means 20 from the operative position.

The hydraulic power system also comprises a control valve 11 for controlling the operation of the hydraulic servo means connected to the hydraulic fluid source 17. The control valve 11 may be connected to a hydraulic fluid source of a separate system. A shuttle valve 12 is connected to the main lines of the closed circuit for withdrawing pressure from a higher-pressure main line, and the pressure is applied to the control valve 11 for actuation thereof. Stated differently, the control valve 11 uses the pressure in the higher-pressure main line as a pilot pressure for controlling a hydraulic fluid supply to the servo means to prevent the pressure in the main line from substantially exceeding a predetermined level. The control valve 11 is set at a pressure lower than the pressure at which the crossover relief valves 7 are set.

The system also comprises a directional control valve 13 interlocked to an operation lever for operating the servo valve 10, and a directional control valve 14 responsive to the supply pressure to the servo means on the output side of the control valve 11. The directional control valves 13 and 14 are connected in parallel in a line connecting the brake means 20 to the hydraulic fluid source 17. A shuttle valve 15 is connected in the line for selecting a higher pressure of the pressure supplied from the valves 13 and 14. Thus, the directional control valve 13 constitutes first pressure transmission control means interlocked with the input means of the servo means for transmitting a control pressure to the brake means 20 when the input means is actuated, and the directional control valve 14 constitutes second pressure transmisson control means responsive to the pressure of a hydraulic fluid supply to the servo means on the output side of the control valve 11 for transmitting the control pressure to the brake means 20 when the supply pressure is substantially lower than a normal supply pressure of the hydraulic fluid source 17.

A check valve 18 is mounted in the line connecting the shuttle valve 15 to the brake means 20 for allowing only a flow of hydraulic fluid from the shuttle valve 15 to the brake means 20, and a throttle valve 19 is mounted in parallel with the check valve 18. The check valve 18 and throttle valve 19 are operative to avoid actuation of the brake means 20 in a transient period such as a period during which operational pressure is produced on the output side of the servo valve 10 after the input means of the servo valve 10 is brought to a neutral position.

The hydraulic power system of the aforesaid construction operates as follows. In an accelerating operation of the hydraulic motor 2, actuation of the operation lever of the servo valve 10 causes the hydraulic servo means, composed of the servo cylinder 9 and servo valve 10, to control the displacement volume of the hydraulic pump 1 in accordance with the actuated stroke of the leverl. At this time, the directional control valve 13, interlocked to the operation lever of the servo valve 10, is switched to allow a control pressure fluid from the hydraulic fluid source 17 to flow through the valve 13, shuttle valve 15 and check valve 18 to the brake means 20 to thereby release the latter from the operative position. As a result, the hydraulic motor 2 tends to operate at a speed commensurate with the displacement volume of the hydraulic pump 1. When the load 3 has high inertia, the motor 2 is prevented from immediately reaching the speed of interest, thereby causing the pressure in the main line on the discharge side of the pump 1 to rise. The pressure is transmitted through the shuttle valve 12 to the control valve 11 and actuates same when the pressure exceeds a predetermined level set for actuation thereof. This reduces the flow rate of the fluid supplied from the source 17 to the servo valve 10 to thereby reduce the rate of change in the displacemennt volume of the pump 1 and thus in the discharge flow rate thereof. Generally, the drive pressure generated upon driving a load of intertia is proportional to the rate of change in the discharge flow rate of the pump 1, and therefore the main-line pressure is lowered at this time. In this way, the pressure in the main lines is controlled not to substantially exceed the predetermined level set by the control valve 11.

In deceleration operation of the hydraulic motor 2 or when the operation level of the servo valve 10 is returned to a neutral position from a given manipulated position in which the hydraulic motor 2 rotates at a constant speed in steadystate operation, the displacement volume of the hydraulic pump 1 tends to drop by the returning of the operation lever of the servo motor 10 to the neutral position. However, at this time the intertia of the load 3 acts on the motor 2 and causes the pressure in the main line on the suction side of the pump 1 to rise. This is what is referred to as a pumping action of the motor 2. The pressure in the main line on the suction side acts on the control valve 11 through the shuttle valve 12 and reduces the rate of change in the displacement volume of the pump 1 so that the pressure in the main line on the suction side is controlled not to exceed substantially the predetermined level set by the control valve 11. Since the control valve 11 is set at a level lower than the pressure at which the cross-over relief valves 7 are set as aforesaid, there is no risk of power loss or generation of heat due to the relief operation both in acceleration and deceleration.

When the operation lever of the servo valve 10 is returned to the neutral position, the directional control valve 13 interlocked thereto is also returned to a neutral position to communicate a line to the brake means 20 to reservoir. However, at this time the pressure in the main line on the suction side of the hydraulic pump 1 quickly rises and the control valve 11 is actuated as above mentioned. Thus, the servo valve 10 is prevented from following up at once the operation lever and returning to the neutral position and is maintained in a transient intermediate position, and therefore the tilting angle of the pump 1 is prevented from instantly returning to the neutral position. At this time, the pressure on the output side of the control valve 11 drops below the normal supply pressure of the pressure fluid source 17 and the pressure drop actuates the directional control valve 14. Thus, when the servo valve 10 is in the transient intermediate position, the releasing of the brake means 20 from the operative position is continued by the control pressure supplied through the directional control valve 14. When the servo valve 10 is brought to the neutral position, in which the pump 1 is in the neutral position and the motor 2 substantially stops rotating, the directional control valve 14 is returned to the neutral position, and the brake means 20 is actuated to take the operative position since the directional control valve 13 is also in the neutral position.

It will be noted that in the first embodiment of the hydraulic power system in conformity with the invention, it is possible to release the brake means 20 from the operative position not only when the operation lever of the servo valve 10 is actuated but also until the motor 2 substantially stops rotating even after the operation lever is returned to the neutral position, and it is also possible to actuate the brake means 20 as soon as the motor 2 stops rotating, so that the brake means 20 is completely free from the influences of changes in the intertia of the load 3.

Figure 2:
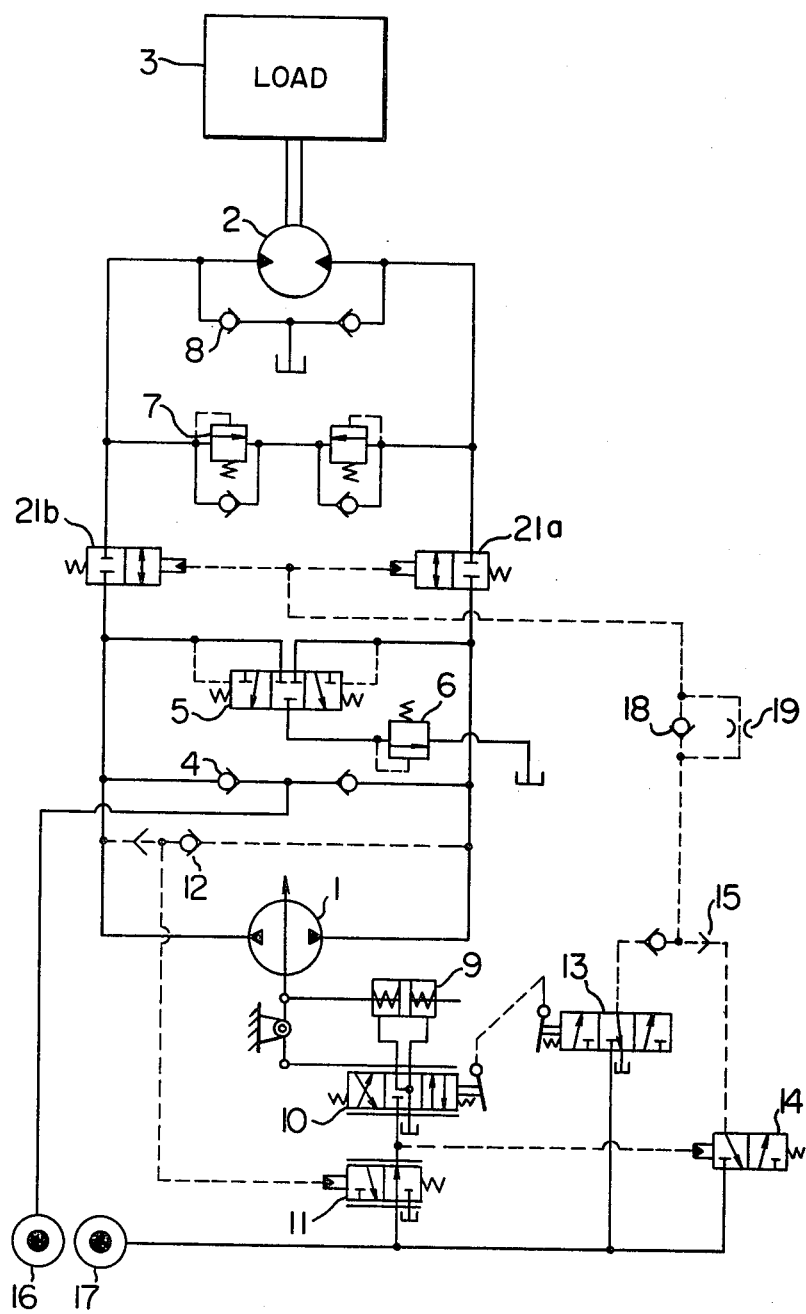
FIG. 2 is a circuit diagram of a hydraulic power system comprising a second embodiment of the invention.

As shown in FIG. 2, the motor stopping means for preventing the hydraulic motor 2 from rotating comprises on-off valves 21a and 21b mounted in the main lines connecting the pump 1 to the motor 2. The on-off valves 21a and 21b are connected to the pressure fluid source 17 through the check valve 18, shuttle valve 15 and directional control valves 13 and 13. Other parts of the modification are similar to those of the embodiment shown in FIG. 1. The crossover relief valves 7 are located on the side of the hydraulic motor 2 with respect to the on-off valves 21a and 21b.

In the hydraulic power system of the aforesaid construction in hydraulic motor acceleration operation, the hydraulic servo means is rendered operative as the operation lever of the servo valve 10 is actuated and, at the same time, a control pressure is supplied to the on-off valves 21a and 21b through the directional control valves 13, shuttle valve 15 and check valve 18, so that the on-off valves 21a and 21b allow the hydraulic fluid to flow through the main lines. In hydraulic motor deceleration operation, the control valve 11 effects control of the hydraulic fluid supply to the servo means to prevent the pressure in the main line on the suction side of the pump 1 from substantially exceeding the predetermined level, as is the case with the first embodiment. When the operation lever is returned to a neutral position, the directional control valve 13 returns to the position shown in FIG. 2 to communicate a line to the on-off valves 21a and 21b to reservoir. However, when the servo valve 10 is in the transient intermediate position and thus the motor 2 does not completely stop rotating, the directional control valve 14 is switched in response to a drop in the pressure on the output side of the control valve 11, so that a control pressure is supplied from the source 17 to the on-off valves 21a and 21b through the valve 14 and check valve 18. Thus, the on-off valve 21a and 21b allow hydraulic fluid to flow through the main lines. When the servo valve 10 is brought to the neutral position, in which the pump 1 is in the neutral position annd the pump 2 stops rotating, the on-off valve 21a and 21b are immediately actuated to prevent the hydraulic fluid to flow through the main lines, as shown in FIG. 2.

In the construction shown in FIG. 2 in which the on-off valves 21a and 21b serve as motor stopping means for preventing the hydraulic motor from rotating, the function of the motor stopping means may be inferior to that of the brake means 20 in arresting the actuation of the motor 2, however, the construction of FIG. 2 is much superior in motor arresting function to a construction in which the operation of the pump 1 alone is relied on for accomplishing the object and is equivalent to a construction using a counterbalancing valve in an open circuit. Also, by positioning the crossover relief valves 7 on the side of the motor 2 with respect to the on-off valves 21a and 21b, it is possible to avoid damage to a power transmission system including the output shaft of the motor 2 and speed reducing gearing in case an inordinately large external force be exerted on the load because the cross-over relief valves 7 are actuated in such case.

It is to be understood that the neutral connection of the servo valve 10, the construction of the input means of the servo valve 10, the connection between the input means and the motor stopping means, the interlocking means for the input means and the directional control valve 13, and the construction of the directional control valves 21a and 21b are not limited to those as disclosed in FIGS. 1 and 2. Also, the control valve 11 is not limited to the construction for controlling the flow rate of pressure fluid supplied to the servo motor 10 and may be constructed such that it is responsive to the pressure in the main lines for generating an output in the form of a controlled pressure or a controlled flow rate, so as to control the operation of the servo means by the output of the control valve.

From the foregoing, it will be appreciated that the embodiment of the hydraulic power system in conformity with the invention is provided with a control valve responsive to the pressure in the main lines of a closed hydraulic circuit for controlling a hydraulic fluid supply to the servo means to prevent the main line pressure from substantially exceeding a predetermined level, first pressure transmission control means interlocked with the input means of the servo means for transmitting a control pressure to the brake means when the input means is actuated, and second pressure transmission control means responsive to the pressure of a hydraulic fluid supply to the servo means on the output side of the cntrol valve for transmitting the control pressure to the brake means when the supply pressure is substantially lower than a normal supply pressure of the hydraulic fluid source. By virtue of these features, it is possible to automatically cause the motor stopping means to be actuated to take its operative position as soon as the hydraulic motor stops rotating without need to mount a separate ancillary hydraulic motor used in the prior art, thereby contributing to simplification of the construction. Also, the need to mount a throttle valve in the main lines for detecting the condition of rotation of the hydraulic motor as in the case with the prior art is eliminated, and it is possible to avoid loss of power because the pressure at which the control valve is set is lower than the pressure at which the cross-over relief valves are set. Also, the need to detect the relieving condition of the cross-over relief valves is eliminated, and the need to use means for providing a time lag after the input means of the hydraulic servo means is restored to a neutral position until the time the motor stopping means is actuated is eliminated, so that it is possible to positively actuate the motor stopping means without being influenced by changes in the inertia of the load.

What is claimed is:

1. A hydraulic power system comprising a variable displacement hydraulic pump, a hydraulic motor driven by said hydraulic pump for actuating a load, said pump and motor being connected to constitute a closed hydraulic circuit, hydraulic servo means for controlling the displacement volume of said pump, and motor stopping means including brake means adapted to release the motor from a braked condition when a control pressure from a hydraulic fluid source is received, wherein the hydraulic power system comprises:

a control valve responsive to a main line pressure in said closed hydraulic circuit for controlling a hydraulic fluid supply to said servo means to prevent said main line pressure from substantially exceeding a predetermined level;

first pressure transmission control means interlocked with input means of said servo means for transmitting said control pressure to said brake means when said input means is actuated; and second pressure transmission control means responsive to the pressure of a hydraulic fluid supply to said servo means on the output side of the control valve for transmitting said control pressure to said brake means when said supply pressure is substantially lower than a normal supply pressure of the hydraulic fluid source.

2. A hydraulic power system as claimed in claim 1, wherein said first pressure transmission control means comprises a first directional control valve interlocked with said input means of said servo means, and said second pressure transmission control means comprises a second directional control valve connected in parallel with said first directional control valve and actuated by said supply pressure to said servo means.

3. A hydraulic power system as claimed in claim 2, further comprising line means for transmitting said control pressure therethrough to said brake means, and a shuttle valve connected to said line means for selecting, as said control pressure a higher pressure of the pressures from said first and second directional control valves, and said first and second directional control valves allow said line means to be communicated with a drain when they are not actuated.

4. A hydraulic power system as claimed in claim 1, wherein said brake means comprises a brake cylinder for applying the brake force to an output shaft of said hydraulic motor.

5. A hydraulic power system as claimed in claim 1, wherein said brake means comprises on-off valves mounted in main lines of the closed hydraulic circuit.

* * * * *